United States Patent
Finn et al.

(10) Patent No.: US 9,441,583 B2
(45) Date of Patent: Sep. 13, 2016

(54) AIR FILTER ASSEMBLY FOR A MACHINE

(71) Applicant: Caterpillar Inc., Peoria, IL (US)

(72) Inventors: Timothy S. Finn, Peoria Heights, IL (US); Shawn M. Ryon, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 104 days.

(21) Appl. No.: 14/294,926

(22) Filed: Jun. 3, 2014

(65) Prior Publication Data
US 2015/0345438 A1    Dec. 3, 2015

(51) Int. Cl.
*F02M 35/02* (2006.01)
*B01D 46/00* (2006.01)
*B01D 46/24* (2006.01)
*F02M 35/024* (2006.01)
*F02M 35/16* (2006.01)

(52) U.S. Cl.
CPC ...... *F02M 35/0203* (2013.01); *B01D 46/0004* (2013.01); *B01D 46/0005* (2013.01); *B01D 46/2414* (2013.01); *F02M 35/02416* (2013.01); *B01D 2265/025* (2013.01); *F02M 35/164* (2013.01); *Y10T 29/49828* (2015.01)

(58) Field of Classification Search
CPC ......... B60K 11/08; F01P 11/10; F01P 11/12; F01P 2003/182; F28F 19/01
USPC .............. 55/385.1, 385.3, 490; 165/119, 122
See application file for complete search history.

(56) References Cited

U.S. PATENT DOCUMENTS

| | | | |
|---|---|---|---|
| 3,742,684 A | 7/1973 | Wait, Jr. | |
| 4,961,762 A * | 10/1990 | Howeth | A47L 11/40 55/302 |
| 5,494,497 A | 2/1996 | Lee | |
| 5,772,883 A | 6/1998 | Rothman et al. | |
| 5,803,939 A * | 9/1998 | Huning | B01D 46/002 55/341.4 |
| 6,385,810 B1 | 5/2002 | Lang | |
| 6,647,562 B1 * | 11/2003 | Arout | E04H 4/0043 4/506 |
| 7,108,738 B2 | 9/2006 | Burns et al. | |
| 7,431,073 B2 * | 10/2008 | Radke | B60K 11/08 165/119 |
| 8,152,885 B2 | 4/2012 | Pfannenberg | |
| 8,277,528 B2 * | 10/2012 | Umemoto | A01D 34/82 55/385.3 |
| 2004/0172927 A1 * | 9/2004 | Lee | B01D 46/0005 55/495 |
| 2005/0235620 A1 | 10/2005 | Connor et al. | |
| 2006/0016163 A1 * | 1/2006 | O'Connor | B01D 46/0005 55/481 |
| 2009/0025402 A1 * | 1/2009 | Mello | B03C 3/09 62/78 |

FOREIGN PATENT DOCUMENTS

FR     2815699     4/2002
WO     0210575     2/2002

* cited by examiner

*Primary Examiner* — Duane Smith
*Assistant Examiner* — Minh-Chau Pham
(74) *Attorney, Agent, or Firm* — Finnegan, Henderson, Farabow, Garrett & Dunner, LLP

(57) ABSTRACT

An air filter assembly for a machine is disclosed. The air filter may have a filter medium, and a side wall connected to the filter medium on a first side of the filter medium. The side wall may have a first engagement feature and a second engagement feature. At least one of the first engagement feature and the second engagement feature may project from the side wall. The first engagement feature and the second engagement feature may be configured to slidingly engage a filter housing.

13 Claims, 5 Drawing Sheets

AIR FILTER ASSEMBLY FOR A MACHINE

TECHNICAL FIELD

The present disclosure is directed to an air filter assembly and, more particularly, to an air filter assembly for a machine.

BACKGROUND

Machines used in the farming, construction, mining, power generation, and other like industries commonly include a frame that supports an internal combustion engine, a work tool movably connected to the frame, and at least one hydraulic cylinder connected between the frame and the work tool and driven by the engine. Such machines typically operate in harsh environments characterized by large amounts of airborne dust, dirt, and debris. In such environments, it is desirable to remove such debris from the air before directing the air to the engine. To assist with this process, machines typically include an intake air filter or other like air cleaner configured to remove airborne debris upstream of the engine.

One drawback of air filters, however, is that they may often need servicing and/or replacement. As debris builds up within the filter medium, air is increasingly restricted from passing through the filter, causing strain on air intake components. Thus, after a certain amount of use, a filter must be replaced and a clean filter installed. However, many current filter assembly designs are not configured for ease of filter installation and removal.

One attempt to provide an interchangeable air filter assembly is disclosed in U.S. Pat. No. 5,494,497 that issued to Lee on Feb. 27, 1996 ("the '497 patent"). In particular, the '497 patent includes an air cleaner housing that defines a slot for slidably receiving a filter element. The air cleaner housing further includes a guide rib for securely mounting the filter element in the slot. However, while the filter assembly of the '497 patent may allow an air filter to be interchangeably installed and removed, it may be limited. In particular, the configuration of the filter assembly of the '497 patent only allows for translational motion of an air filter, limiting the possible range of motion and constraining the configuration of the air cleaner housing.

The present disclosure is directed to overcoming one or more of the problems set forth above and/or other problems of the prior art.

SUMMARY

In one aspect, the present disclosure is directed to an air filter. The air filter may include a filter medium, and a side wall connected to the filter medium on a first side of the filter medium. The side wall may include a first engagement feature and a second engagement feature. At least one of the first engagement feature and the second engagement feature may project from the side wall. The first engagement feature and the second engagement feature may be configured to slidingly engage a filter housing.

In another aspect, the present disclosure is directed to an air filter assembly. The air filter assembly may include an air filter. The air filter may include a filter medium, and a side wall connected to the filter medium on a first side of the filter medium. The side wall may include at least one engagement feature. The filter assembly may further include a filter housing that includes at least one housing engagement feature. The at least one engagement feature and the at least one housing engagement feature may be configured to slidingly engage each other to at least partially define an installation path for the air filter to move between a position outside of the filter housing and an operating position inside the filter housing. The installation path may include translational and rotational motion of the air filter.

In yet another aspect, the present disclosure is directed to a method of installing an air filter. The method may include moving the air filter through an installation path into an operating position inside a filter housing. The installation path may include translational motion to move the air filter into the filter housing, and rotational motion to rotate a sealing member of the air filter into sealing engagement with the filter housing.

DETAILED DESCRIPTION

Figure 1:
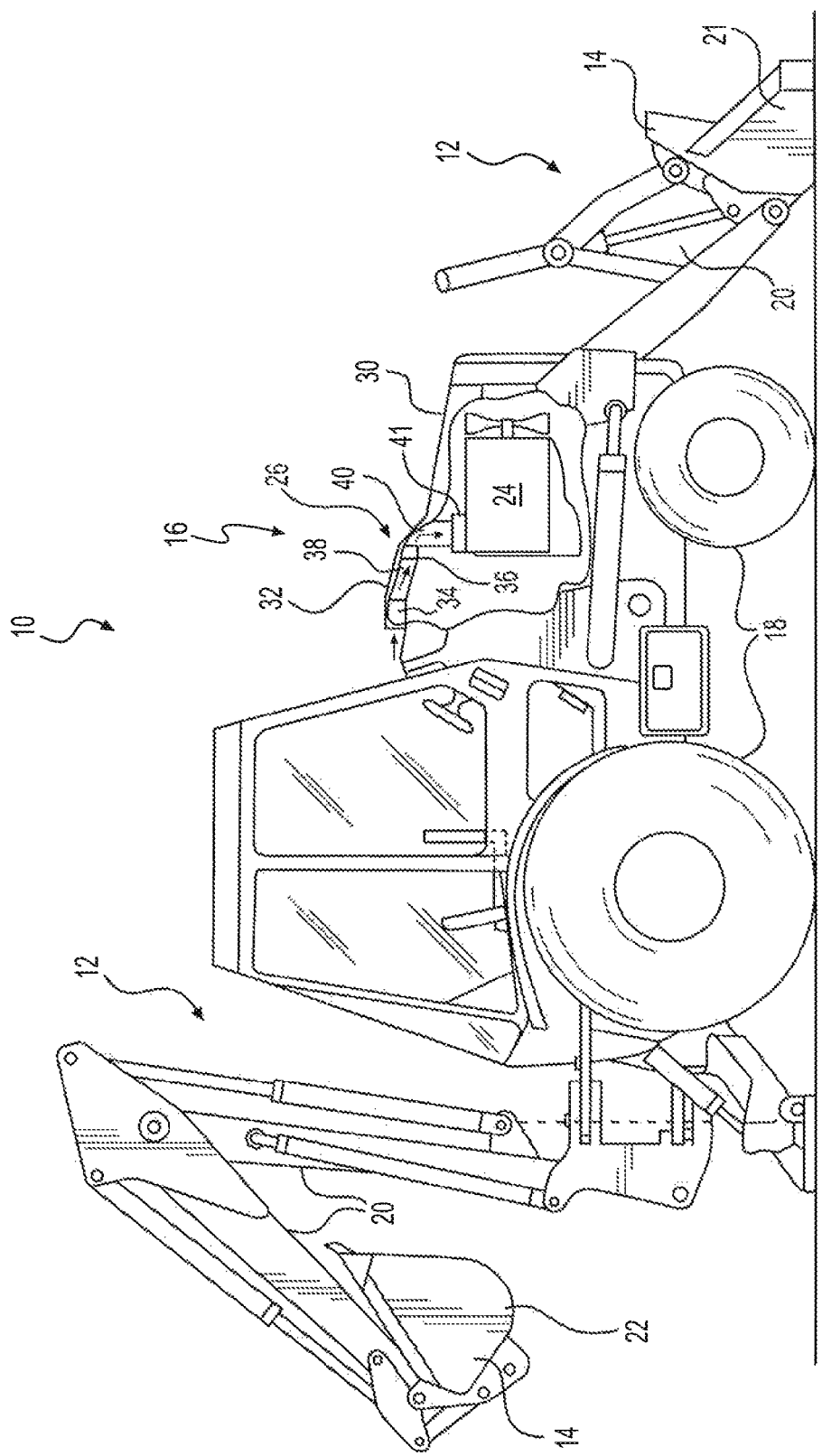
FIG. 1 is a pictorial illustration of an exemplary disclosed machine.

FIG. 1 depicts an exemplary machine 10 of the present disclosure. Machine 10 may embody a mobile or stationary machine that performs an operation, such as an operation associated with construction, farming, mining, or transportation. For example, machine 10 may be a backhoe loader (shown in FIG. 1), a bulldozer, a motor grader, an excavator, a track-type tractor, a wheel loader, an on-road vehicle, an off-road vehicle, a generator set, or other like machines. Machine 10 may include an implement system 12 configured to move one or more work tools 14 and a power system 16 for providing power to at least one traction device 18 and/or implement system 12.

Implement system 12 may include one or more linkage structures 20 acted on by one or more actuators to move work tools 14. Numerous different work tools 14 may be attachable to a single machine 10 and controllable by an operator and/or a control system. For example, as shown in the embodiment of FIG. 1, machine 10 may include an excavator bucket 21 at one end and a backhoe assembly 22 at an opposite end. It should be understood, however, that machine 10 may include any work tool that includes any device used to perform a particular task such as, for example, a blade, a plow, a movable bed, or another task-performing device known in the art. Further, in some embodiments, machine 10 may not include implement system 12 and/or work tools 14. For example, machine 10 may be a transportation vehicle or a generator set.

Power system 16 may include an engine 24 such as, for example, a diesel engine, a gasoline engine, a gaseous-fuel powered engine such as a natural gas engine, a dual-fuel engine, or any other type of engine apparent to one skilled in the art. Power system 16 may additionally or alternatively include a non-combustion source of power such as a fuel cell, a power storage device, an electric motor, or other similar mechanism. Engine 24 may be connected to drive traction devices 18 (e.g., via an electric motor), thereby propelling machine 10.

Traction devices 18 may include wheels located on each side of machine 10 (only one side shown). Alternatively, traction device 18 may include tracks, belts, or other known traction devices. It is contemplated that any of the traction devices 18 on machine 10 may be driven and/or steered.

Power system 16 may further include an air filter assembly 26 for providing air to engine 24. In particular, air filter assembly 26 may be configured to receive environmental air (referred to herein as "intake air"), remove dust, dirt, particulates, water, and other like debris from the intake air, and direct cleaned intake air to engine 24 for use in the combustion process. As shown in FIG. 1, air filter assembly 26 may include a filter housing 32 integrated into machine 10. For example, filter housing 32 may be integrated into an engine hood 30 of machine 10. It should be understood, however, that air filter assembly 26 may have other arrangements. For example, filter housing 32 may be integrated into another component of machine 10 or may be a separate component spaced from machine 10.

In an exemplary embodiment, air filter assembly 26 may include, among other things, filter housing 32, a pre-cleaner 34, and an air filter 36. Pre-cleaner 34 may be configured to receive intake air from an environment of machine 10 and may be fluidly connected to air filter 36 via an air passage 38. Air filter assembly 26 may further include an air passage 40 fluidly connecting air filter 36 to an intake manifold 41 or other like intake air component of engine 24 (e.g., a turbocharger inlet). Intake manifold 41 may distribute the intake air to one or more cylinders of engine 24 in a manner known in the art.

Figure 2:
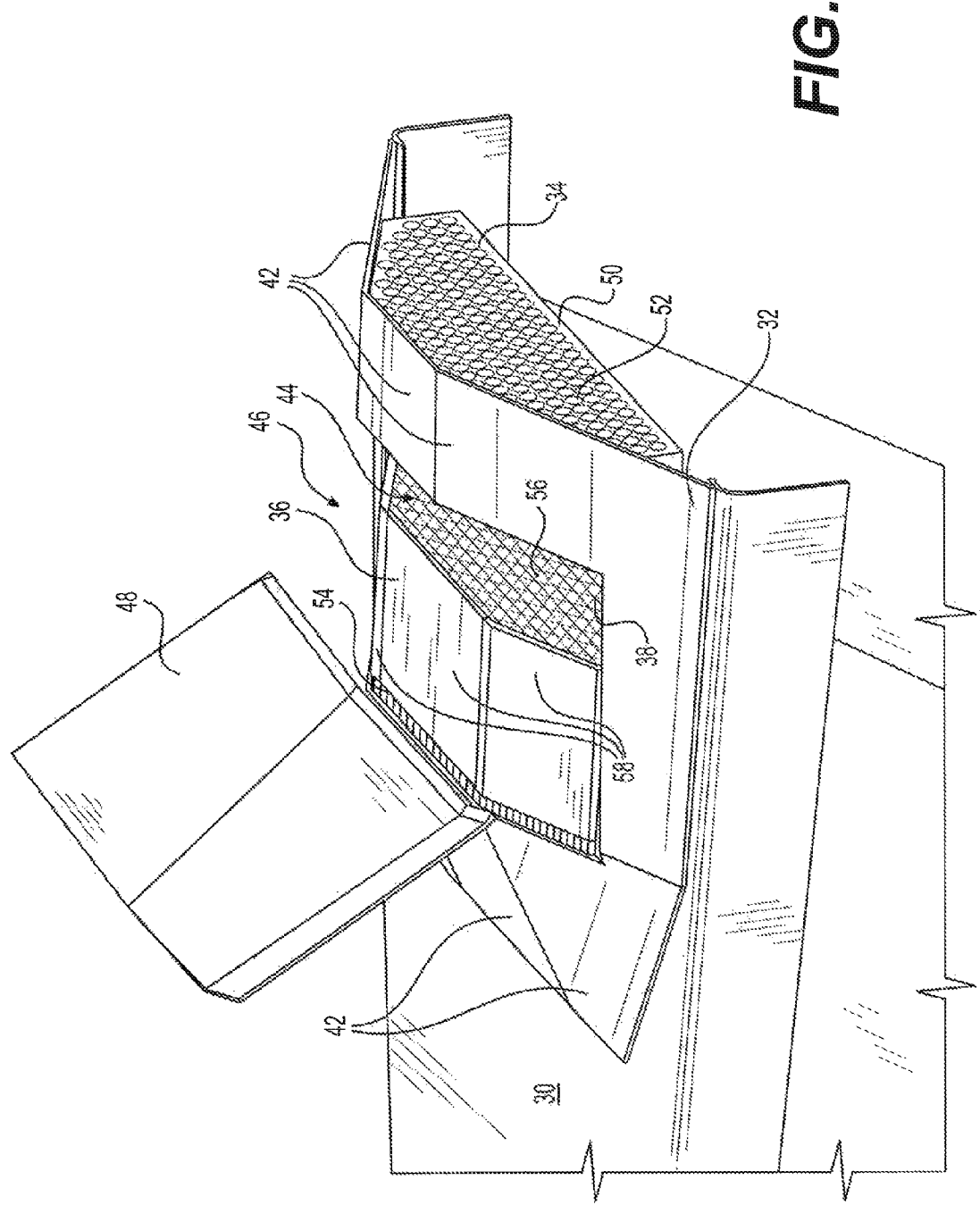
FIG. 2 is a schematic illustration of an exemplary disclosed air filter assembly that may be utilized with the machine of FIG. 1.

FIG. 2 depicts air filter assembly 26 in more detail. As shown, at least a portion of air filter assembly 26 may project from engine hood 30. For example, filter housing 32 may include a plurality of connected panels 42 that, together with engine hood 30, form a filter enclosure 44. Filter enclosure 44 may house pre-cleaner 34 and air filter 36, and at least partially form air passage 38. Filter housing 32 may form an opening 46 that provides access into filter enclosure 44. A lid 48 may be configured to cover opening 46 and at least partially close filter enclosure 44. In an exemplary embodiment, lid 48 may be hingedly connected to one or more of panels 42 and rotatable between an open position (shown in FIG. 2) and closed position (not shown), although other configurations are possible (e.g., lid 48 being a unattached panel).

As shown in FIG. 2, pre-cleaner 34 may be positioned at one end of filter enclosure 44. Pre-cleaner 34 may be secured to an inner surface of panels 42 in any manner. For example, pre-cleaner may be removably secured via one or more fasteners, or may be permanently secured and/or integrally formed with filter housing 32. In an exemplary embodiment, an inlet side of pre-cleaner 34 may be exposed to an environment of machine 10 such that intake air may enter air filter assembly 26 through pre-cleaner 34. In some embodiments, an opening (not shown) and passage (not shown) formed in filter housing 32 or another component may fluidly connect the environment with pre-cleaner 34. In some alternative embodiments, air filter assembly 26 may not include pre-cleaner 34 (e.g., air passage 38 may directly receive air from outside of machine 10 without being "pre-cleaned").

Pre-cleaner 34 may be any air cleaning device known in the art configured to perform an air cleaning function. For example, pre-cleaner 34 may include a known pre-cleaning structure configured to remove relatively large debris from the intake air and to direct such "pre-cleaned air" to air filter 36 for further cleaning. In an exemplary embodiment, pre-cleaner 34 may include a base 50 and a plurality of filtration components 52. Base 50 may comprise a housing shaped to substantially match a shape of filter housing 32. Base 50 may be configured to receive intake air from an environment of machine 10 and to remove debris from the intake air via filtration components 52 disposed therein.

Each filtration component 52 may comprise a substantially cylindrical tube-like filtration device configured to remove relatively large debris from the intake air. Each filtration component 52 may include one or more components (not shown) configured to assist in separating debris from the intake air. Such components may include, for example, one or more vanes, fins, venturiis, restrictions, screens, meshes, or other like components. Filtration components 52 may be further configured such that separated debris may be carried to an exhaust passage (not shown) and collected and/or released back to the environment.

Base 50 may further include an outlet (not shown) configured to direct intake air that passes through pre-cleaner 34 into air passage 38. Air filter 36 may be positioned in filter enclosure 44 at an end of air passage 38 opposite pre-cleaner 34. As will be described in more detail, air filter 36 may be removably secured to filter housing 32 and accessed through opening 46. In this way, air filter 36 may be inserted into filter enclosure 44 and secured in an operating position (the position shown in FIG. 2) through opening 46. Similarly, air filter 36 may be moved from the operating position and removed from filter housing 32 through opening 46. Lid 48 may be closed to enclose air filter 36 in the operating position and opened to allow access to air filter 36. In an exemplary embodiment, air filter 36 and lid 48 may include substantially corresponding shapes, such that air that enters air passage 38 from pre-cleaner 34 is directed to air filter 36. Air filter 36 may further include a sealing member 54 configured to engage one or more inner surfaces of filter housing 32 to inhibit air from bypassing air filter 36.

Figure 3:
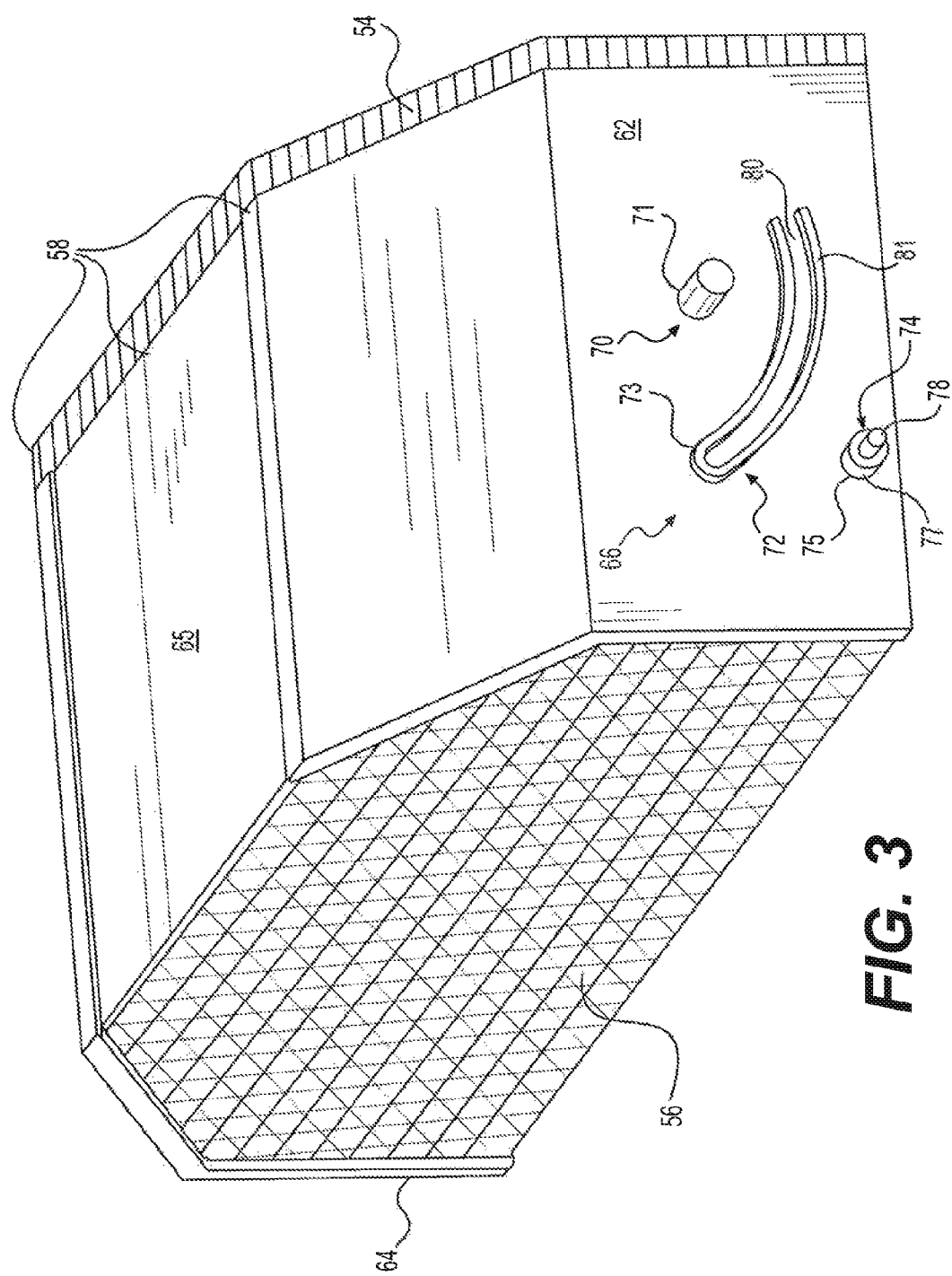
FIG. 3 is an illustration of an exemplary disclosed air filter that may be utilized with the air filter assembly of FIG. 2.

FIG. 3 depicts air filter 36 in more detail. In an exemplary embodiment, air filter 36 may include a filter medium 56, a casing 58 connected to the filter medium 56, and sealing member 54. In an exemplary embodiment, casing 58 may be a separate component directly secured to filter medium 56. It should be understood, however, that casing 58 may be connected to filter medium 56 as an integral component of filter medium 56 and/or connected through one or more intermediate components (e.g., casing 58 may be connected to filter medium 56 with one or more components therebetween).

Filter medium 56 may comprise any type of air cleaner known in the art configured to sufficiently condition intake air for use by engine 24. For example, filter medium 56 may be configured to remove relatively small debris from air that was pre-cleaned by pre-cleaner 34. Accordingly, filter medium 56 may comprise paper, mesh, or other like filtration media that is relatively less porous than filtration components 52 of pre-cleaner 34. In exemplary embodiments, filter medium 56 may be corrugated to assist in removing debris from the pre-cleaned air, and may be substantially linear, substantially cylindrical, and/or any other known shape or configuration. Referring to FIGS. 1-2, with air filter 36 in the operating position, air may enter filter medium 56 from air passage 38, exit filter medium 56 on an opposite side, and enter air passage 40.

Sealing member 54 may at least partially surround filter medium 56. Sealing member 54 may be configured to sealingly engage filter housing 32 such that intake air may be inhibited from bypassing filter medium 56 to reach engine 24. Sealing member 54 may be any type of seal, such as a gasket or O-ring, and may be made from any material configured to provide a sufficient seal between air filter 36 and filter housing 32.

Casing 58 may be connected to filter medium 56 and configured to provide rigidity and strength to air filter 36. For example, casing 58 may be formed from a strong and durable plastic material and shaped to cover one or more non-inlet/outlet sides of filter medium 56. For example, as shown in FIG. 3, casing 58 may include side walls 62, 64 configured to cover opposing lateral sides of filter medium 56, respectively. In some embodiments, casing 58 may further include a side wall 65 configured to cover a top side of filter medium 56 and/or a side wall (not shown) configured to cover a bottom side of filter medium 56. As used herein a "side wall" may be any wall, surface and/or face that is part of air filter 36. Casing 58 may be formed as one or more panels, which may be separate from each other or integrally formed.

In an exemplary embodiment, filter housing 32 and air filter 36 may include components configured to allow for easy installation and removal of air filter 36. In particular, as shown in FIG. 3, casing 58 of air filter 36 may include one or more connectors 66 configured to matingly engage with filter housing 32. Specifically, connectors 66 may include one or more engagement features 70, 72, 74 configured to slidingly engage one or more corresponding housing engagement features 170, 172, 174 (shown only in FIGS. 4-5) of filter housing 32. As used herein "sliding engagement" includes mating engagement features contacting each other and moving relative to each other while in contact. It should be understood that, in addition to sliding, the relative motion may include relative rotation.

As shown in FIG. 3, engagement features 70, 72, 74 may be connected to side wall 62 of casing 58. Engagement features 70, 72, 74 may be integrally formed in or on side wall 62, or formed as separate components and secured to side wall 62. In an exemplary embodiment, at least one of engagement features 70, 72, 74 may project from side wall 62 (e.g., away from filter medium 56). Engagement features 70, 72, 74 may be configured to slidingly engage with corresponding housing engagement features 170, 172, 174 such that air filter 36 may be moved along an installation path into the operating position from outside of filter housing 32.

In an exemplary embodiment, engagement features 70, 72, 74 may each be one of a slot or a pin, although other configurations are possible, such as a roller, linkage, etc. For example, as shown in the embodiment of FIG. 3, engagement feature 70 may be a pin 71, engagement feature 72 may be a slot 73, and engagement feature 74 may be a pin 75. Pins 71 and 75 may each be configured to slidably engage a slot. Slot 73 may be configured to slidably engage a pin. While pins 71 and 75 and slot 73 are shown and described, it should be understood that other configurations of connectors 66 may be included with air filter 36 and utilized to perform the same function. For example, in some embodiments, one or more of engagement features 70, 72, and 74 may be omitted or replaced with one or more different engagement features. In some embodiments, engagement features 70, 72, and 74 may each be the same type of engagement feature (e.g., each pins or each slots).

In the embodiment shown in FIG. 3, pins 71 and 75 may be cylindrical projections extending from side wall 62. In an exemplary embodiment, pin 71 may include a uniform diameter. Pin 75, on the other hand, may include two differently-sized portions. For example, pin 75 may include a base portion 77 and a distal portion 78. Base portion 77 may include a larger diameter than distal portion 78. In an exemplary embodiment, base portion 77 may be approximately equal to a diameter of pin 71. In an alternative embodiment, pin 75 may include a uniform diameter, which may be smaller than, larger than, or approximately the same as the uniform diameter of pin 71. Similarly, pin 71 may include differently-sized portions, such as those described with respect to pin 75. It should be understood that various size configurations of pins 71 and 75 may be utilized to help prevent air filter 36 from being installed in filter housing 32 incorrectly.

As shown in FIG. 3, slot 73 may include a groove 80 formed by a wall projection 81 extending from side wall 62, although other configurations are possible. For example, slot 73 may be an integrally formed slot that extends partially into or completely through side wall 62. In an exemplary embodiment, slot 73 may be configured to receive at least a portion of a pin and define a pathway for the pin to slidingly follow. In an exemplary embodiment, an opening into the pathway may be located within a perimeter of side wall 62. As shown in FIG. 3, at least a portion of the pathway defined by slot 73 may be curvilinear. Slot 73 may include a uniform width along substantially an entire length of slot 73. At least a portion of slot 73 may be positioned between pin 71 and pin 75.

While not shown, it should be understood that side wall 64 may also include one or more additional engagement features configured to engage filter housing 32. For example, side wall 64 may include additional engagement features that are identical to engagement features 70, 72, 74 (e.g., two pins and a slot). It should be understood, however, that side wall 64 may include one or more additional engagement features that are different from engagement features 70, 72, 74, or are omitted, or may not include any engagement features.

Figure 4:
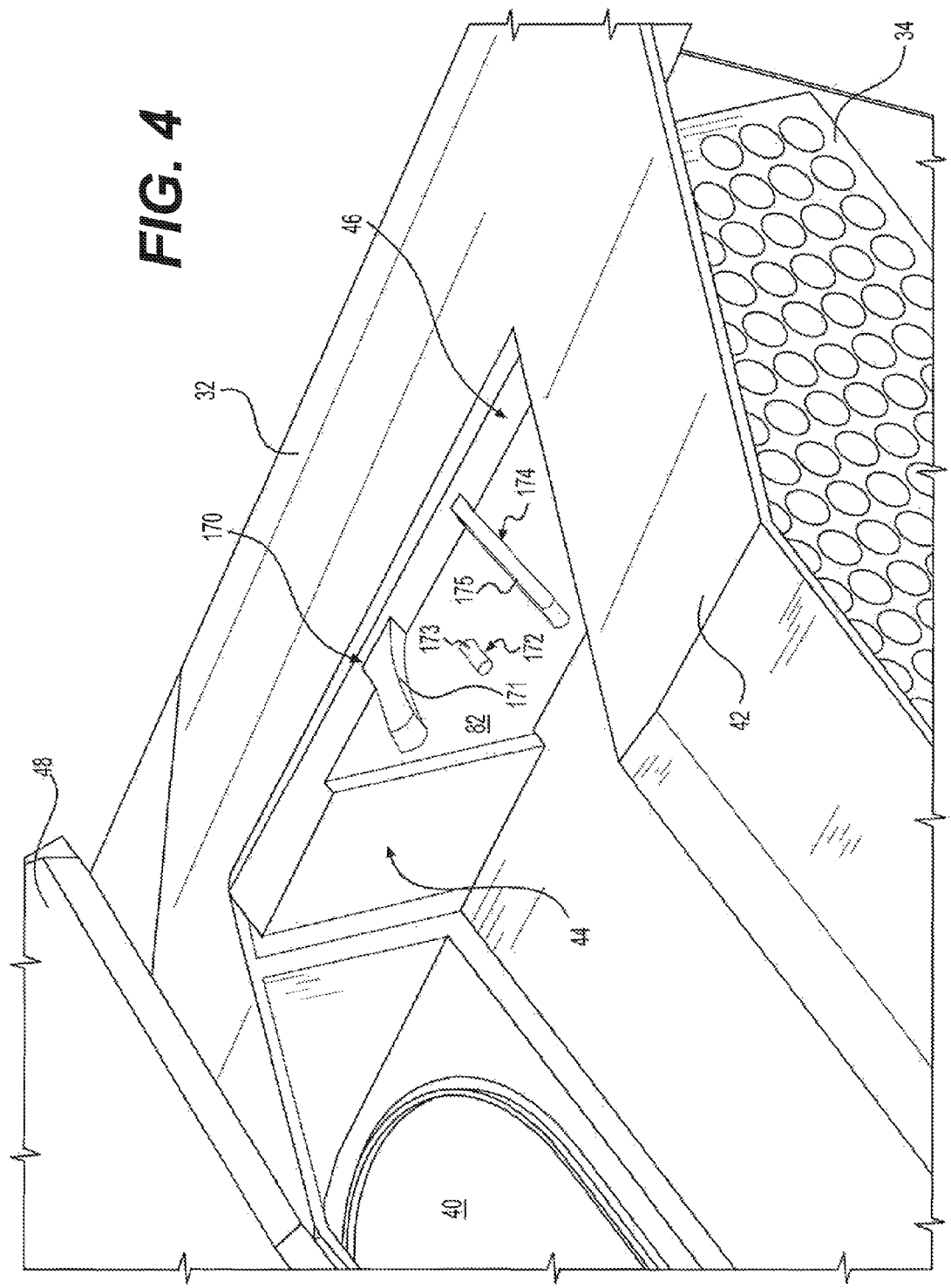
FIG. 4 is an illustration of a portion of an exemplary disclosed filter housing that may be utilized with the air filter assembly of FIG. 2.

FIG. 4 further depicts a portion of filter housing 32, showing an inner wall 82 of filter enclosure 44. Inner wall 82 may include the one or more housing engagement features 170, 172, and 174, which may be configured to slidingly engage with the one or more engagement features 70, 72, and 74, respectively. For example, in the embodiment shown in FIG. 4, housing engagement feature 170 may be a slot 171 configured to receive at least a portion of pin 71, housing engagement feature 172 may be a pin 173 configured to be received within slot 73, and housing engagement feature 174 may be a slot 175 configured to receive pin 75. It should be understood however, that housing engagement features 170, 172, and/or 174 may be differently configured, depending on a configuration (or omission) of engagement features 70, 72, and 74. For example, in an embodiment in which engagement features 70, 72, and 74 are pins, housing engagement features 170, 172, and 174 may each be slots configured to receive the pins.

In an exemplary embodiment, slot 171 and slot 175 may be integrally formed in inner wall 82. It should be understood, however, that slot 171 and/or slot 175 may be formed in a different manner. For example, one or more of slots 171 and 175 may be formed by a wall projection extending from inner wall 82 (similar to wall projection 81). Each of slot 171 and slot 175 may form a pathway for a pin (e.g., pins 71 and 75) to slidingly follow. In an exemplary embodiment, at least a portion of slot 171 may be curvilinear, while slot 175 may be substantially linear. It should be understood, however, that slots 171 and 175 may include other configurations. For example, at least a portion of slot 175 may also be curvilinear. Slot 171, pin 71, slot 175, and/or pin 75 may be sized such that pins 71 and 75 may follow the pathways formed by slots 171 and 175, with sufficient clearance to allow for smooth movement and relative rotation.

In an exemplary embodiment, slot 171 may include a width that is greater than slot 175. In this way, slot 171 may correspond to the uniform diameter of pin 71 and slot 175 may correspond to the smaller diameter of distal portion 78 of pin 75. In this way, pin 71 may be too large to be inserted into slot 175, which may help to prevent air filter 36 from being inserted into filter housing incorrectly (e.g., with pin 75 in slot 171 and pin 71 in slot 175).

Pin 173 may be a cylindrical projection extending from inner wall 82. Pin 173 may include a uniform diameter or may include two or more sections with different diameters. Pin 173 and/or slot 73 may be sized such that pin 173 may follow the pathway formed by slot 73, with sufficient clearance to allow for smooth movement and relative rotation.

While not shown, it should be understood that filter housing 32 may also include one or more additional housing engagement features configured to engage with additional engagement features on side wall 64. For example, an inner wall (not shown) positioned opposite inner wall 82 may include additional housing engagement features that are identical to housing engagement features 170, 172, 174 (e.g., two slots and a pin). It should be understood, however, that the opposite inner wall may include one or more additional housing engagement features that are different from housing engagement features 170, 172, 174, or are omitted, or may not include any housing engagement features, depending on the configuration of the additional engagement features on side wall 64.

Figure 5:
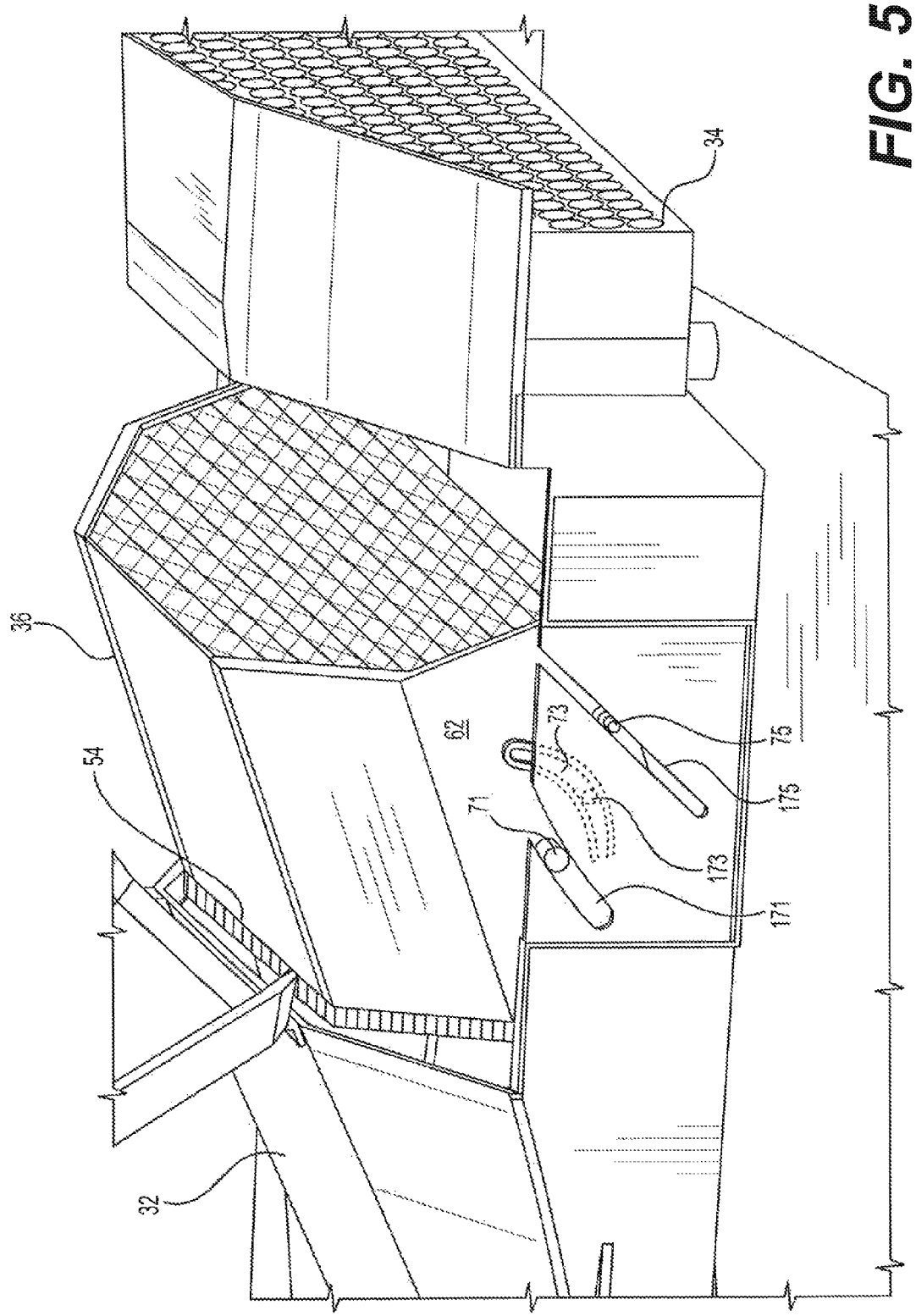
FIG. 5 is a cut-away illustration of the air filter assembly of FIG. 2.

FIG. 5 depicts air filter 36 partially inserted into filter housing 32, illustrating mating engagement therebetween. In particular, pin 71 is received in slot 171, pin 173 is received in slot 73, and pin 75 is received in slot 175. As air filter 36 moves relative to filter housing 32, pins 71 and 75 may move along the pathways formed by slots 171 and 175 and slot 73 may be guided over pin 173 to move air filter 36 between a position outside of filter housing 32 and the operating position (the position shown in FIG. 2). The shape of slots 171, 73, and 175 may constrain movement of air filter 36 such that air filter 36 follows an installation path into and out of the operating position.

INDUSTRIAL APPLICABILITY

The disclosed air filter assembly may be used with any machine having an air intake system. In particular, the disclosed air filter assembly may be used with a mobile or stationary machine having an engine to clean intake air before it is directed to the engine. In addition, the disclosed air filter assembly is configured to allow for easy installation and removal of an air filter. In particular, corresponding engagement features on the air filter and filter housing may slidingly engage each other to allow the air filter to move from outside of the filter housing into an operating position. In addition, the engagement features are configured to direct the air filter through an installation path that includes translational and rotational motion, allowing for a wide variety of filter housing configurations. In addition, the rotational motion of the installation path may allow a seal to more easily and securely move into sealing engagement with the filter housing. The manner in which an exemplary air filter may be installed and removed from a corresponding filter housing is described in more detail below.

Machine 10 may operate to perform one or more tasks, which may include operation of engine 24 to provide power to traction devices 18 and/or implement system 12. As engine 24 operates, intake air may be directed through air filter assembly 26 to intake manifold 41 and eventually to one or more cylinders of engine 24 for use in combustion. As the intake air passes through air filter assembly 26, air filter 36 may help clean the air by removing debris, which may be trapped by filter medium 56 in a manner known in the art. At some point during a lifetime of machine 10, it may be determined that air filter 36 should be replaced (e.g., after a certain amount of use) and a new and/or cleaner air filter 36 installed.

In order to install an air filter 36, engagement features 70, 72, 74 of air filter 36 may be lined up with corresponding housing engagement features 170, 172, 174 of filter housing 32 and engaged with each other. For example, pin 71 may be inserted in slot 171, slot 73 may be moved to insert pin 173 through the opening into slot 73, and pin 75 may be inserted into slot 175. As shown in FIG. 5, air filter 36 may be rotated into an installation orientation relative to an operating orientation (e.g., an orientation of air filter 36 when air filter 36 is in the operating position of FIG. 2) to allow pins 71, 173, and 75 to be inserted in corresponding slots 171, 73, and 175. As referred to herein, the installation orientation may be an orientation of air filter 36 at which pins 71, 173, and 75 are just inserted into corresponding slots 171, 73, and 175 (or other arrangement of engagement features and housing engagement features are just inserted into each other). The installation orientation may include an end of air filter 36 that includes sealing member 54 positioned lower relative to the opposite end of air filter 36.

It should be understood that any additional engagement features on side wall 64 on an opposite side of filter medium 56 (e.g., opposite from side wall 62) may similarly engage additional housing engagement features on an opposite side of filter housing 32 (e.g., opposite from inner wall 82). For example one or more pins on side wall 64 may be inserted into corresponding slots in filter housing 32 and/or one or more slots on side wall 64 may be guided over corresponding pins on filter housing 32.

With engagement features 70, 72, 74 slidingly engaged with housing engagement features 170, 172, 174, air filter 36 may be moved through an installation path into the operating position. In particular, pin 71 may slide within slot 171 to move through the pathway defined by slot 171, pin 173 may slide within slot 73 to guide slot 73 over pin 173, and pin 75 may slide within slot 175 to move through the pathway defined by slot 175. The configuration of slots 171, 73, and 175 may constrain movement of air filter 36 such that air filter 36 follows the installation path. In addition, the configuration of slots 171, 73, and 175 may be such that the installation path includes translational and rotational motion.

In an exemplary embodiment, translational motion of air filter 36 moving on the installation path may include air filter 36 moving from a position at least partially outside of filter housing 32 to the operating position inside filter housing 32. Similarly, rotational motion of air filter 36 moving on the installation path may include air filter 36 rotating from the installation orientation to the operating orientation. In an exemplary embodiment, air filter 36 may be rotated approximately 45° between the installation orientation and the operating orientation. In addition, rotational motion may include sealing member 54 being rotated into sealing engagement with filter housing 32. For example, sealing member 54 may move upwardly into the operating orientation to sealingly engage inner surfaces of filter housing 32.

In this way, an air filter 36 (which be the first air filter installed during initial assembly or a replacement air filter) may be installed into filter housing 32. Air filter 36 may be similarly removed from filter housing 32 by moving air filter 36 through the installation path in a reverse direction. In particular, pin 71 may be moved along slot 171, slot 73 guided over pin 173, and pin 75 moved along slot 175, until pins 71, 173, and 75 are removed from corresponding slots 171, 73, and 175.

Using the exemplary disclosed air filter assembly and installation method described above, an air filter may be easily installed and removed from a filter housing. In particular, the configuration of engagement features and housing engagement features allows the air filter to be guided along an installation path that includes translational motion to move the air filter into the filter housing and rotational motion to rotate the air filter into an operating position. The combination of translational and rotational motion may allow the air filter to be moved into a precise position within the filter housing, properly engaging a sealing member and resisting inadvertent movement out of the operating position. These and other advantages may allow an operator to service an air filter assembly more efficiently by saving time needed for service while providing an effective air cleaning system.

It will be apparent to those skilled in the art that various modifications and variations can be made to the air filter assembly of the present disclosure without departing from the scope of the disclosure. For example, a disclosed air filter assembly may include any number of engagement features configured to allow an air filter to move through an installation path. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. An air filter, comprising:
   a filter medium;
   a side wall connected to the filter medium on a first side of the filter medium, the side wall including:
      a first engagement feature including a slot configured to slidingly engage a pin on the filter housing; and
      a second engagement feature including a pin configured to slidingly engage a slot on the filter housing,
   wherein:
      at least one of the first engagement feature and the second engagement feature project from the side wall, and
      the first engagement feature and the second engagement feature are configured to slidingly engage a filter housing.

2. The air filter of claim 1, wherein the slot defines a pathway and at least a portion of the pathway is curvilinear.

3. The air filter of claim 1, wherein:
   the slot includes a wall projection that defines a pathway and an opening into the pathway, and
   the opening into the pathway is within a perimeter of the side wall.

4. The air filter of claim 1, wherein the side wall further includes a third engagement feature configured to slidingly engage the filter housing.

5. The air filter of claim 4, wherein:
   the third engagement feature is a second pin configured to slidingly engage a second slot on the filter housing.

6. The air filter of claim 1, wherein the side wall is a first side wall and the air filter further includes a second side wall on a second side of the filter medium, the second side wall including at least a third engagement feature configured to slidingly engage the filter housing.

7. An air filter assembly, comprising:
   an air filter including:
      a filter medium, and
      a side wall connected to the filter medium on a first side of the filter medium and including at least two engagement features, the at least two engagement features including a first pin and a first slot; and
   a filter housing including at least two housing engagement features, the at least two housing engagement features including a second slot configured to engage the first pin, and a second pin configured to slidingly engage the first slot,
   wherein the at least two engagement features and the at least two housing engagement features are configured to at least partially define an installation path for the air filter to move between a position outside of the filter housing and an operating position inside the filter housing, and
   wherein the installation path includes translational and rotational motion of the air filter.

8. The air filter assembly of claim 7, wherein:
   the first slot defines a first pathway,
   the second slot defines a second pathway,
   at least a portion of the first pathway is curvilinear, and
   the second pathway is substantially linear.

9. The air filter assembly of claim 7, wherein:
   the side wall is a first side wall and the air filter further includes a second side wall on a second side of the filter medium, the second side wall including at least one additional engagement feature, and
   the filter housing further includes at least one additional housing engagement feature configured to slidingly engage the at least one additional engagement feature.

10. The air filter assembly of claim 7, wherein:
    the air filter further includes a sealing member, and
    the at least one engagement feature and the at least one housing engagement feature define the installation path such that the sealing member rotates into sealing engagement with the filter housing when the air filter moves to the operating position.

11. A method of installing an air filter as recited in claim 1, comprising:
    moving the air filter through an installation path into an operating position inside a filter housing, the installation path including:
       translational motion to move the air filter into the filter housing, and
       rotational motion to rotate a sealing member of the air filter into sealing engagement with the filter housing.

12. The method of claim 11, wherein moving the air filter includes slidingly engaging at least one engagement feature of the air filter with at least one housing engagement feature of the filter housing.

13. The method of claim 12, wherein slidingly engaging at least one engagement feature of the air filter with at least one housing engagement feature of the filter housing includes:
    guiding a slot of the air filter over a pin of the filter housing, sliding a first pin of the air filter within a first slot of the filter housing, and sliding a second pin of the air filter within a second slot of the filter housing.

\* \* \* \* \*